W. O. BARNETT.
BACK BAND AND HOOK ATTACHMENT THEREFOR.
APPLICATION FILED FEB. 23, 1907.
901,060.
Patented Oct. 13, 1908.
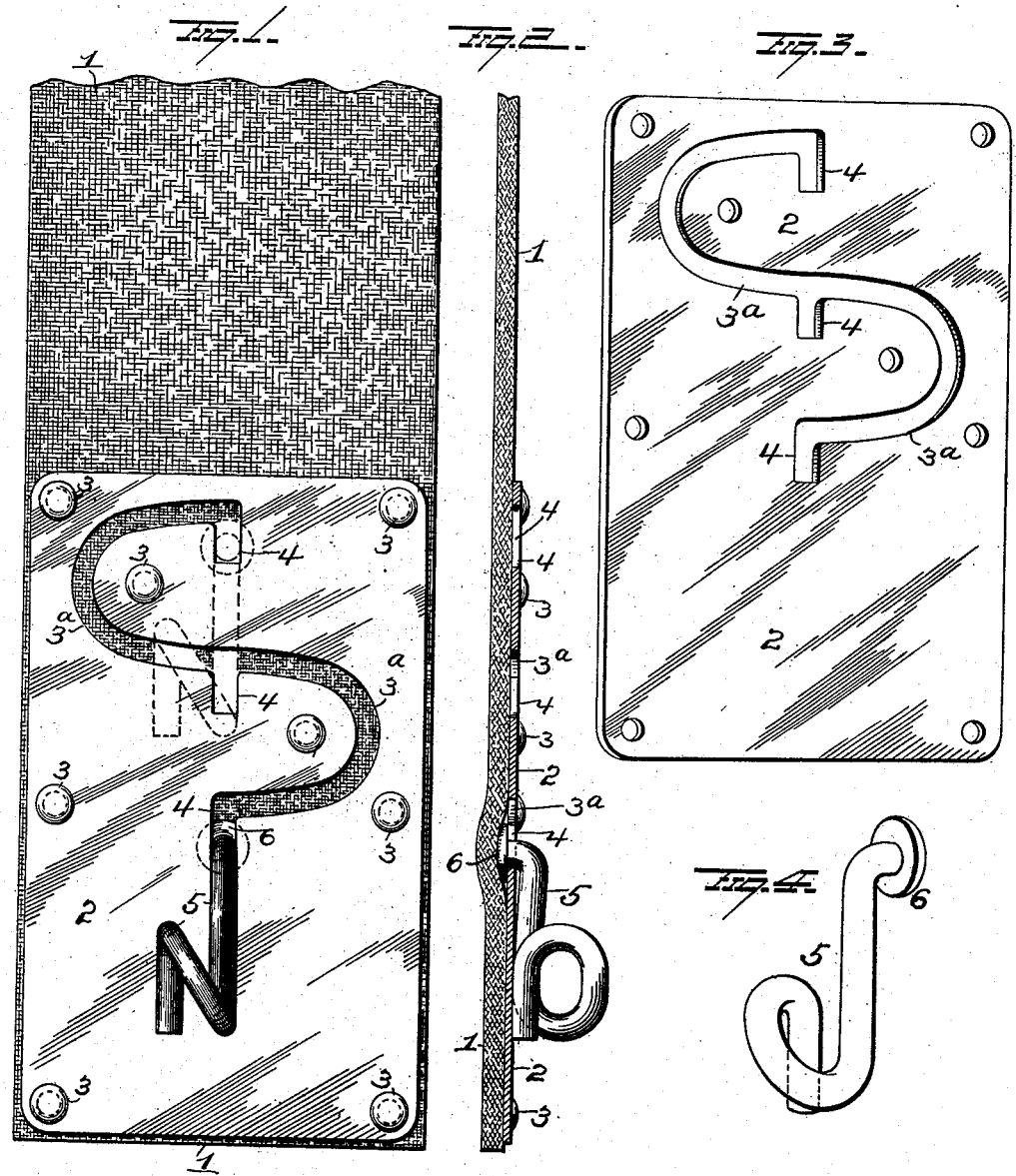

UNITED STATES PATENT OFFICE.

WILLIAM OSBORNE BARNETT, OF AMERICUS, GEORGIA.

BACK-BAND AND HOOK ATTACHMENT THEREFOR.

No. 901,060.     Specification of Letters Patent.     Patented Oct. 13, 1908.

Application filed February 23, 1907. Serial No. 358,926.

*To all whom it may concern:*

Be it known that I, WILLIAM O. BARNETT, a resident of Americus, in the county of Sumter and State of Georgia, have invented certain new and useful Improvements in Back-Bands and Hook Attachments Therefor; and I do hereby declare the following to be a full, clear, and exact description of the invention, such as will enable others skilled in the art to which it appertains to make and use the same.

My invention relates to improvements in back bands and hook attachment therefor, the object of the invention being to provide a hook which can be adjusted and which will be maintained out of contact with the animal.

With these and other objects in view, the invention consists in certain novel features of construction and combinations and arrangements of parts as will be more fully hereinafter described and pointed out in the claims.

In the accompanying drawings, Figure 1 is a view in elevation illustrating my improvements. Fig. 2 is a view in section, and Figs. 3 and 4 are views of the hook and its supporting plate detached.

1 represents a back band, which may be of fabric or leather, and to which, at its ends, metal plates 2 are secured by rivets 3, as shown.

Each plate 2 is made with a slot $3^a$ having a general compound curvature with offsets 4 at intervals, said offsets being of the same width as the body or main portion of the slot, to receive the hook 5 therein. The hook 5 which projects through slot 3 is provided with a head 6 on its inner end, larger than the diameter of the slot to secure the hook to the plate, yet permit movement of the hook in the slot to any of the offsets 4, all of which latter are in alinement and located different distances from the end of the band or strap 1 and hence permit the chain trace (not shown) connected to the hook to be adjusted to suit conditions. By locating the slot $3^a$ with its offsets 4 in the upper portion of the plate, the lower portion of the latter will serve to prevent the engagement of the hook 5 with the back band and prevent the hook from injuring the horse.

The hook may be made in various ways, the form shown consisting of a metal rod bent into coiled shape to receive the trace chain and having two points of engagement with the plate, to prevent turning of the hook while in use.

The slot may of course be made of several convolutions in its curvature to provide more than three points of adjustment of the hook and I do not restrict myself in this regard, and a great many other changes might be made in the general form and arrangement of parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

The combination with a strap or band, of a flat plate secured thereto and provided with a slot having a compound curvature forming a series of tongues projecting laterally toward the respective side edges of the plate, the latter provided with notches at the inner ends of said tongues and communicating with said slot, a hook movable in the slot and having a head confined between the plate and strap or band and engaging both, the headed end of the hook adapted to engage in any of the notches, and fastening devices securing said tongues against the strap or band.

In testimony whereof, I have signed this specification in the presence of two subscribing witnesses.

WILLIAM OSBORNE BARNETT.

Witnesses:
    H. E. ALLEN,
    S. R. HEYS.